Dec. 11, 1962 R. L. STEDFELD 3,067,928
LIGHTWEIGHT ENGINE
Filed Jan. 25, 1960 4 Sheets-Sheet 1

INVENTOR.
Rowland L. Stedfeld
BY
C. L. Spencer
ATTORNEY

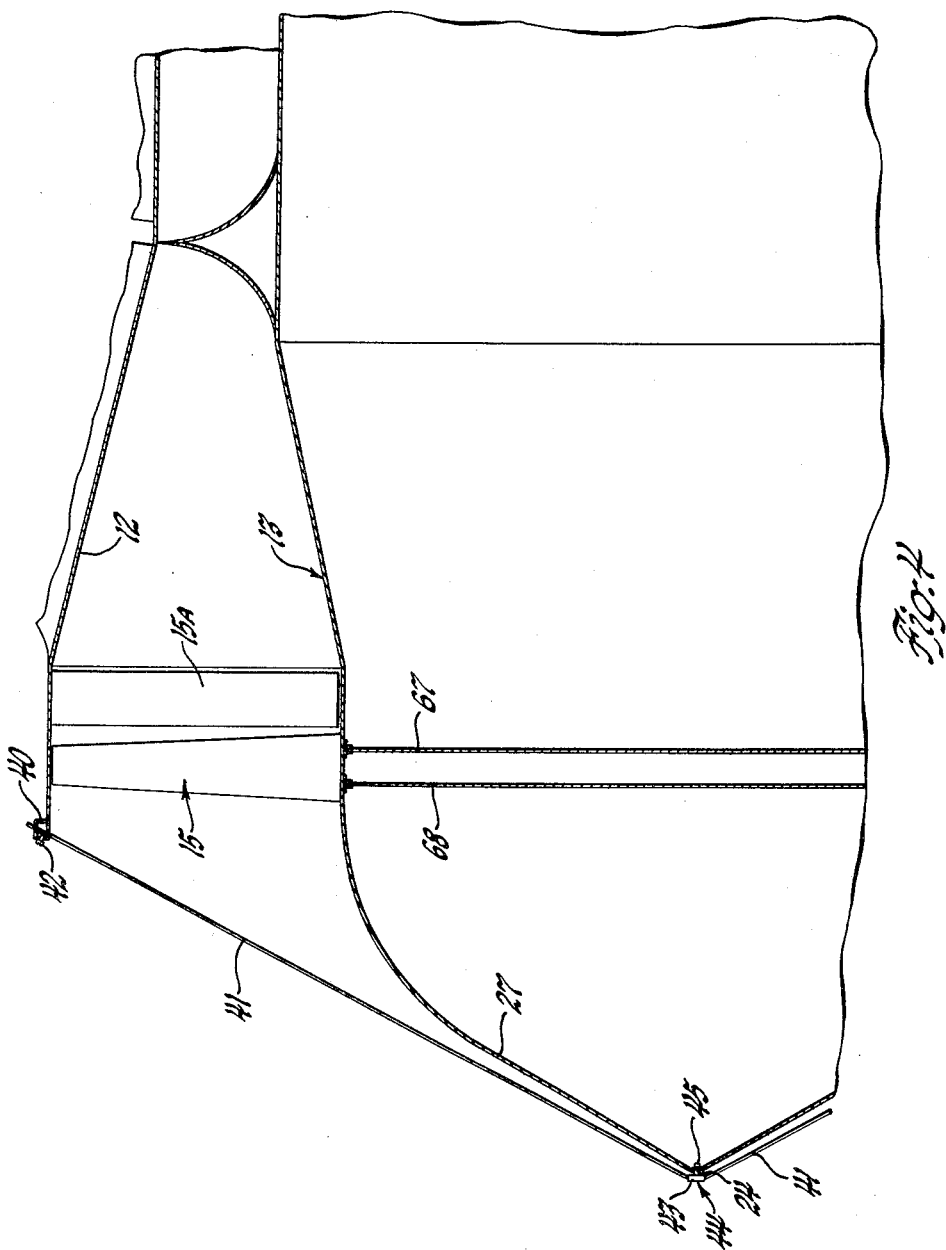

Dec. 11, 1962 R. L. STEDFELD 3,067,928
LIGHTWEIGHT ENGINE
Filed Jan. 25, 1960 4 Sheets-Sheet 3
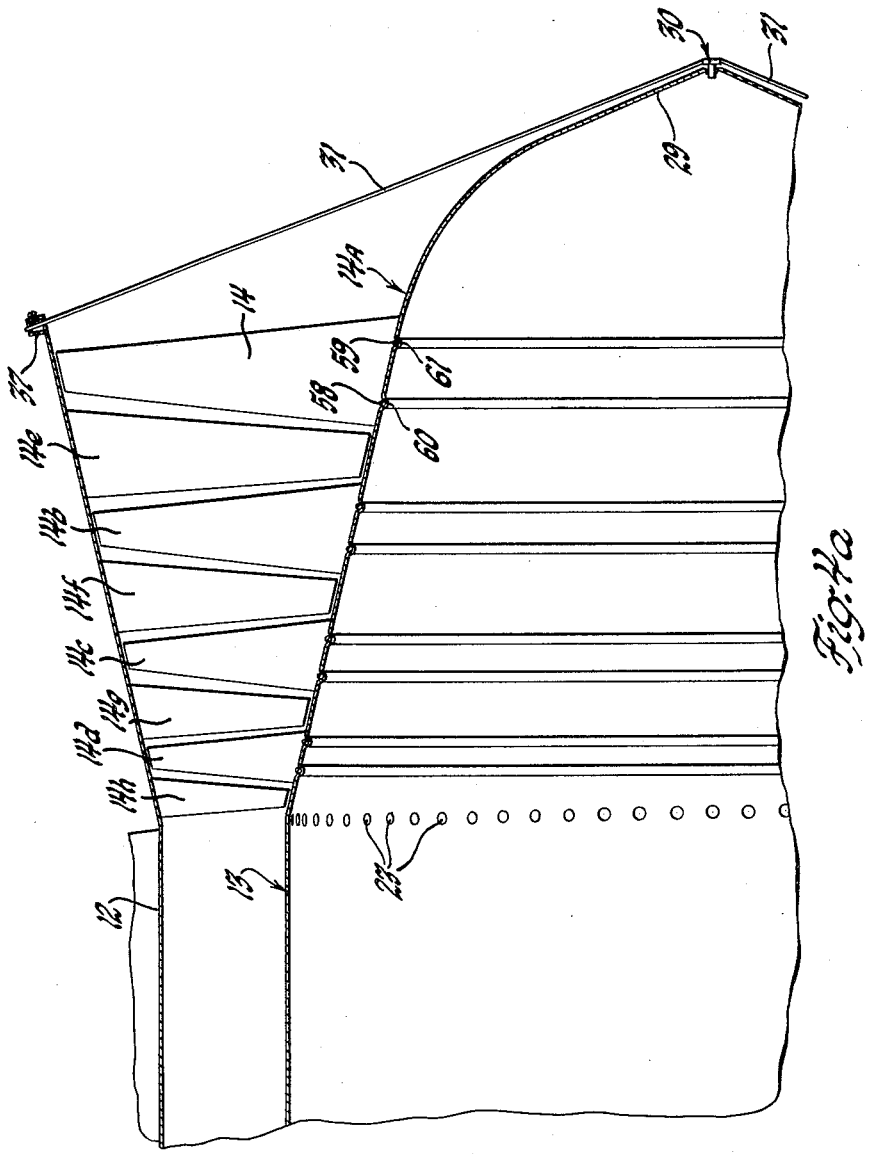
INVENTOR.
Rowland L. Stedfeld
BY
R. L. Spencer
ATTORNEY

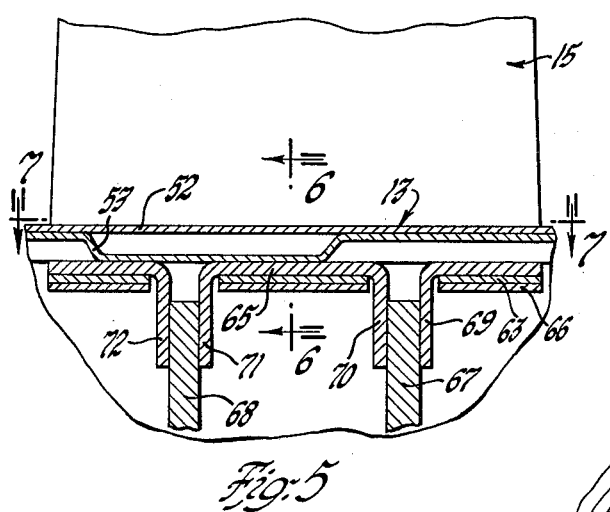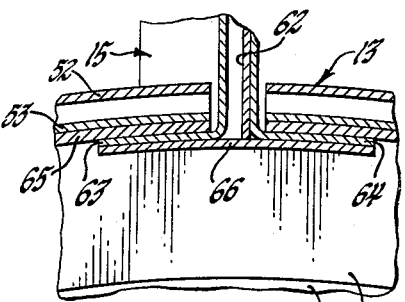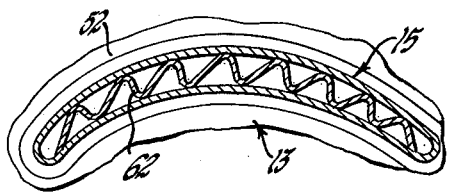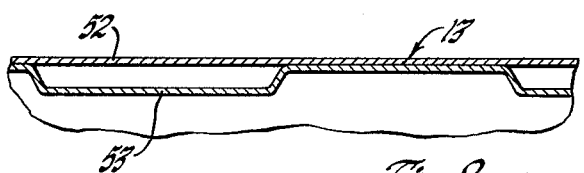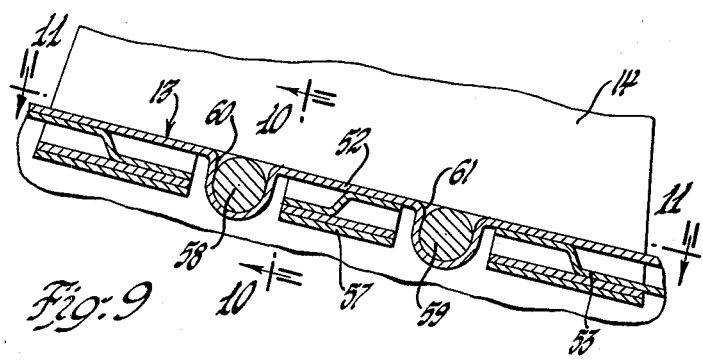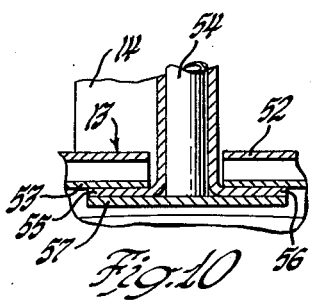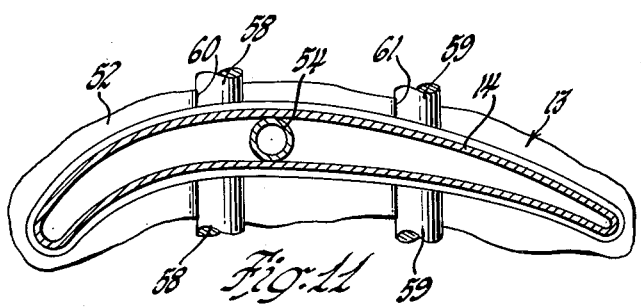

United States Patent Office 3,067,928
Patented Dec. 11, 1962

3,067,928
LIGHTWEIGHT ENGINE
Rowland L. Stedfeld, Indianapolis, Ind., assignor to General Motors Corporation, Detroit, Mich., a corporation of Delaware
Filed Jan. 25, 1960, Ser. No. 4,420
12 Claims. (Cl. 230—116)

This invention relates to engines, and more particularly to a gas turbine engine particularly designed and constructed to be of extreme light weight for a given capacity of power rating. In order to provide such an engine each component is designed to be as light as possible and to perform more than one function where possible. The various components are fabricated by new and different fabrication techniques.

An object of this invention is to provide a turbine engine of extremely light weight for a given size and horsepower capacity.

Another object of this invention is to provide a turbine engine in which each component part is made as light as possible.

An additional object of this invention is to provide a turbine engine in which the rotor drum is formed of very thin sheet metal having a thin waffle shaped support member extending throughout the area of the internal surface of the drum and welded thereto.

A further object of this invention is to provide a turbine engine having a rotor drum formed of very thin sheet metal and having a plurality of compressor and turbine blades of extreme light weight construction carried by the drum.

A more particular object of this invention is to provide a turbine engine rotor drum formed of very thin sheet metal and formed to provide a pressurized vessel wherein the compressor blades and turbine blades are mounted on the drum by slotting the drum, inserting the base of the blades through the drum, forming flanges on the blades within the drum and welding the flanges to the internal surface of the drum.

Another object of this invention is to provide a reinforcing member within the drum and extending across the base of the blades and flanges to reinforce the support of the blades on the drum and to prevent escape of air through the blade receiving slots formed in the drum.

An additional object of this invention is to provide a light weight reinforcing member disposed between the outer skin of the drum and the base of the compressor blades for reinforcing the drum and distributing local loads applied to the drum by the compressor blades.

A more particular object of this invention is to provide a turbine engine having a rotor drum formed of any thin sheet metal and having compressor blades supported thereon wherein the outer sheet of the drum is shaped to provide a pair of U-shaped annular recesses extending around the drum beneath each row of blades and wherein a thin wire reinforcing member is placed in each groove between the outer surface of the drum and the base of the blade and extends entirely around the outer surface of the drum.

A further object of this invention is to provide an extremely light weight drum for a turbine engine having a pair of support discs disposed within the drum for distributing the load applied to the drum by the turbine blades.

Another object of this invention is to provide a novel light weight support mechanism for supporting the rotor drum of a turbine engine in a case.

An additional object of this invention is to provide a rotor drum having a series of openings in its outer surface to admit air under pressure to enter the drum to pressurize the drum and having an air passage for conducting air from the interior of the drum to one of the drum support bearings for cooling the bearing.

Still another object of this invention is to provide a rotor drum for a turbine engine formed of thin sheet material and having an annular member between the compressor and turbine for blocking the direct passage of air from the compressor to the turbine and for stiffening the drum intermediate the compressor air turbine.

A particular object of this invention is to provide a light weight support mechanism for supporting the rotor drum of a turbine engine in a case including a bearing at each end of said drum and a plurality of thin rods extending from each bearing to the case wherein the rods at each end of the drum are easily adjustable with respect to the case and wherein the rods at one end of the drum form a cone with its vortex rearwardly of the drum and the rods at the opposite end of the drum form a cone with its vortex forwardly of the drum to prevent axial motion of the drum.

These and other objects and advantages of this invention will be apparent from the following description and claims taken in conjunction with the accompanying drawings, in which:

FIGURE 4 is an enlarged schematic view of the turbine portion of the engine.

FIGURE 4A is an enlarged schematic view of the compressor portion of the engine.

FIGURE 5 is a sectional view illustrating the details of rotor drum fabrication and support discs for supporting the drum beneath the turbine blades.

FIGURE 6 is a sectional view taken along the line 6—6 of FIGURE 5 and illustrating the manner in which the turbine blades are mounted upon the rotor drum.

FIGURE 7 is a sectional view through a turbine blade taken along the line 7—7 of FIGURE 5, illustrating the internal support for the blade.

FIGURE 8 is a sectional view through the rotor drum illustrating the support member within the drum.

FIGURE 9 is a sectional view through the rotor drum illustrating the support means for reinforcing the drum beneath the compressor blades.

FIGURE 10 is a sectional view taken along the line 10—10 of FIGURE 9 illustrating the manner in which the compressor blades are attached to the rotor drum.

FIGURE 11 is a sectional view through a compressor blade taken along the line 11—11 of FIGURE 9 illustrating the internal support for the compressor blade.

Figure 1:
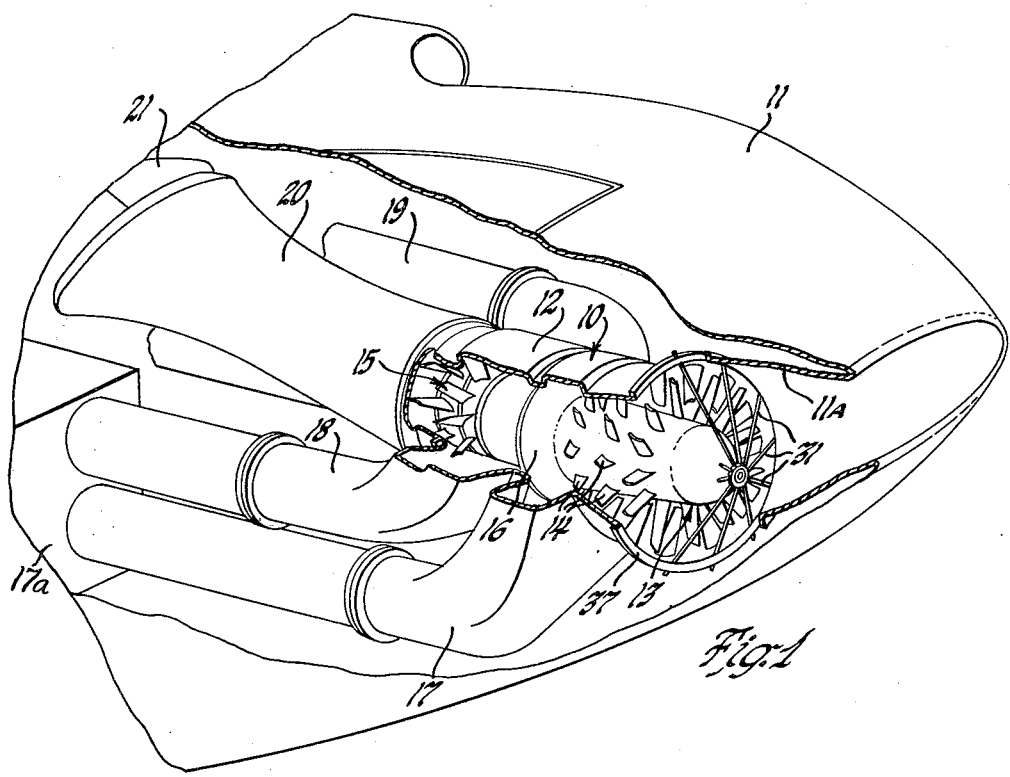
FIGURE 1 is a perspective view of an engine constructed in accordance with the principles of this invention and mounted in an airplane wing.

Referring to FIGURE 1 there is shown an engine 10 constructed in accordance with the principles of this invention supported in a wing cowling 11. Engine 10 includes an outer case 12 enclosing a rotor drum 13 supporting a plurality of compressor blades 14 and turbine blades 15 thereon. Intermediate the compressor blades 14 and turbine blades 15, an annular member 16 is carried by rotor drum 13, the annular member 16 extending outwardly from the outer surface of drum 13 to a point adjacent outer case 12. Member 16 serves to stiffen rotor drum 13 and to block-off the direct passage of air from compressor blades 14 to turbine blades 15. A passage 17 conducts compressed air from the pressure side of the compressor to a suitable heat exchanger or other means 17a for additional imparting heat to the compressed air. Passages 18 and 19 return the heated air to turbine blades 15. A nozzle 20 converts the air pressure to velocity after the heated air under pressure passes through turbine blades 15 to provide thrust. The sole function of turbine blades 15 is to drive rotor drum 13 and compressor blades 14.

Figure 2:
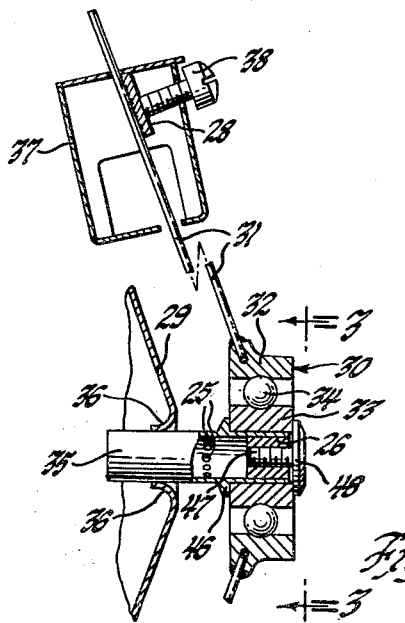
FIGURE 2 is a partially sectional view illustrating the details of one of a pair of similar support means for rotatably supporting the rotor drum in the outer shell of the engine.
Figure 3:
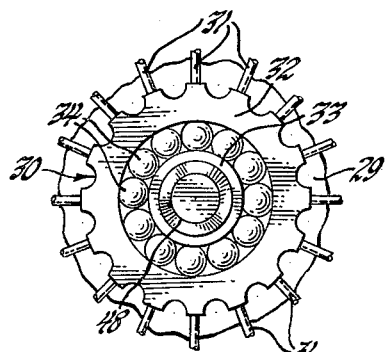
FIGURE 3 is an end view taken along the line 3—3 of FIGURE 2.

As shown particularly in FIGURE 4A the compressor 14A is a four stage compressor having compressor blades 14, 14b, 14c and 14d carried by rotor drum 13 and stator blades 14e, 14f, 14g and 14h fixed to outer case 12. Rotor drum 13 is rotatably supported at the compressor end by means of a bearing 30 (see FIGS. 2 and 3) supported upon outer case 12 by means of a series of support wires 31 fixed to an outer race 32 of bearing 30 and to outer case 12. A series of ball bearings 34 are disposed between outer race 32 and an inner race 33 of bearing 30. A hollow support pin 35 is welded to bent in flanges 36 on the conical end 29 of rotor drum 13 and extends outwardly from drum 13 and through race 33. Support rods 31 are brazed into the bearing outer race 32. A ring 37 formed on outer case 12 receives the spokes 31, the spokes being attached to ring 37 by means of a series of set screws 38 and clamp members 28. Spokes 31 may be preloaded and adjusted in any suitable manner and then clamped by the set screws 38 to retain their adjustment. Ring 37 formed on outer case 12 not only provides the bearing support but also the main engine mounting points. As shown in FIGURE 1, ring 37 is brazed to a bent under flange 11A on cowling 11 to support outer case 12 on the cowling. As shown in FIGURE 4, shell 12 is supported at the rear of the engine in the same manner as at the front. A ring 40 on outer case 12 constitutes an attaching means for one end of rear spokes 41. Spokes 41 may be adjusted for position in ring 40 and gripped by a clamp screw 42. The opposite ends of spokes 41 are brazed to the outer ring 43 of a bearing 44 as in the case of bearing 30. A support pin 45 brazed to the conical end 27 of rotor drum 13 is carried by bearing 44 to support the drum in the bearing. Ring 40 may be brazed to cowling 11 at the rear of the case in the same manner as ring 37 at the front of the case. Sixteen spokes 31 are provided at the forward end of the case and a similar number of spokes 41 are provided at the rear of the case 12. The locus of the spokes 31 at the forward bearing 30 forms a cone with its vertex forward of the drum 12. The locus of the spokes 41 at the rear bearing 44 forms a cone with its vertex rearwardly of rotor drum 12. The sloping of the rods 31 and 41 provides the axial stability required for clearances at each end between the rotor and stators.

Support pin 35 has a bearing retainer 46 brazed thereto to grip one side wall of inner race 33 of bearing 30. A threaded plug 26 is brazed to hollow support pin 35 and is adapted to receive a threaded bearing retainer 47 having a cap 48 adapted to grip the opposite side wall of bearing 30 when retainer 47 is screw threaded into plug 46. The construction whereby bearing 44 at the rear of drum 13 is adapted to support pin 45 is similar to that just described. A series of openings 25 and 24 through hollow support pins 35 and 45 permit a limited passage of air from within the drum 13 to the bearings 30 and 44 for cooling the bearings.

Rotor drum 13 is fabricated of very thin sheet material, preferably of the order of .001 inch and stiffened throughout by means of a .001 inch waffle sheet. The material up to the point where the working fluid returns from the heat exchanger through passages 18 and 19 is preferably formed of titanium and beyond that point is steel. The entire rotor drum 13 is a pressure vessel pressurized by compressor discharge air through a series of openings 23 in the drum surface located at the compressor exit. This pressure within drum 13 provides some stiffening to the drum by producing a longitudinal tension in the drum skin. As heretofore explained, the conical ends 29 and 27 of drum 13 at the air inlet and the turbine exit have stub shafts 35 and 45 each of which provide a bearing journal. The stub shaft 45 at the aft end has openings 24 similar to openings 25 just fore and aft of the bearing 44 through which a small amount of the compressor discharge air which was admitted to the interior of drum 13 through openings 26 will discharge and tend to cool the bearing. Thus, while there is a continuous flow of air through the interior of drum 13 when the engine is in operation, nevertheless, the interior of the drum remains pressurized to stiffen the drum. As shown in FIGURE 8, rotor drum 13 is made up of an outer skin sheet 52 reinforced throughout its under-surface by means of a waffle shaped reinforcing member 53 brazed or welded to skin 52 at the areas of contact of the skin and waffle member. As stated, drum skin 52 and reinforcing waffle sheet 53 are each preferably of the order of .001 of an inch in thickness for light weight construction. The skin and waffle member are preferably formed of titanium sheet, but may be formed of beryllium sheet. The use of beryllium in place of titanium would reduce the engine weight approximately ten percent. The waffle reinforcing member 53 overlies the entire surface of skin 52 and is coextensive with skin 52.

The compressor blades 14 shown in FIGURES 9 through 11 are fabricated of light sheet metal, such as beryllium sheet having a thickness of .001 inch thickness. A thin wall beryllium tube stiffener 54 is placed inside the hollow blade at the axis of twist to provide static stiffness and to maintain the correct airfoil shape. The blade will be initially overtwisted so that when the engine is running the correct twist will be obtained. As shown in FIG. 10, each blade is inserted through a slot in the drum and the airfoil sheets are flared over inside the rotor drum 13 at 55 and 56 and spot welded to the drum. A reinforcing ring 57 is welded to flared portions 55 and 56 and to the end of reinforcing tube 54. Ring 57, placed over the open end of the cutouts inside the drum, provides a continuous tangential load path over the cut-outs in the drum and provides an air seal.

As shown in FIGURES 4A and 9, a pair of reinforcing wires 58 and 59 are disposed in recessed channels 60 and 61 respectively in sheet 52. Wires 58 and 59, formed of titanium, form continuous bands around the drum 13 and pass under the blades 14. In operation, the blade load is first transferred to the rotor drum, and the local binding moments produced by the concentrated blade loads are picked up by the two reinforcing wire rings. The two rings 58 and 59 which pass under the blades are effective to pick up the bending load applied to the drum by the blade and to partially resist it and to partially redistribute it.

Referring to FIGURES 5, 6 and 7, the details of the turbine blades 15 and their method of mounting to drum 13 is shown. The turbine blades 15 are formed of a thin sheet metal material of the order of .001 inch thickness, preferably of a super alloy sheet capable of withstanding relatively high temperatures without loss of strength. As shown in FIGURE 7, turbine blade 15 is shaped to form a hollow airfoil shape. A corrugated sheet metal stiffener 62 formed of a thin sheet of metal preferably .001 inch thickness is disposed within the hollow blade 15 to maintain the airfoil shape, the twist, and to provide bending stiffness. As shown in FIGURE 6, the hollow blade 15 extends through a slot in drum 13 and is flanged outwardly at 63 and 64 to contact an angle doubler 65. The double 65 is welded to the waffle reinforcing member 53 of rotor drum 13 and the flanges 63 and 64 are welded to doubler 65. A ring 66 overlies flanges 63 and 64 to stiffen the joint and to prevent leakage of air from the interior of the drum outwardly. To resist local loads at the base of the turbine blade 15, two reinforcing discs 67 and 68 are provided, as shown in FIGURES 4 and 5. The discs 67 and 68 are welded to the angle doubler 65, the doubler 65 having upstanding flanges 69, 70 adapted to receive disc 67 and flanges 71 and 72 adapted to receive disc 68. The discs are welded, respectively to the flanges in which they are inserted. Discs 67 and 68 are relatively thick when compared to the rest of the sheet metal structure. Discs 67 and 68 are each of the order of .005 inch thickness whereas the rest of the structure is formed of sheet metal of the order of .001 inch thickness. Disc 68 is welded to flanges 71 and 72 of doubler 65. Reinforcing discs 67 and 68 are provided with a central opening (not shown) to permit the pressurized air to pass to cone end 27.

It will be understood from the foregoing description that there has been provided an engine of extremely light weight construction. Each component has been designed to be of very light weight and to perform more than one function where possible. The support rods 31 and 41 not only provide the means whereby rotor drum 13 is rotatably mounted to outer case 12, but also, by being positioned and held by clamps 38 and 42 to enclose a cone at each end of drum 13, provide for axial stability to maintain proper clearances between the compressor blades 14 and the compressor stators 14e through 14h and between the turbine stator 15A and turbine blades 15. The ring 37 formed integrally on outer case 12 provides the mounting member whereby both the spokes 31 and the cowling 11 are fastened to the outer case 12. The annular member 16 on drum 13 not only serves to prevent direct passage of air from the compressor section to the turbine section but also serves to strengthen the drum between these sections. The openings 23 in drum 13 together with openings 24 in rear bearing pin 45 permit the air under pressure to enter the interior of the drum to pressurize the drum for strength and to also continuously cool the rear bearing 44.

Outer case 12 is fabricated in the same manner as rotor drum 13, being made up of an assembly of a thin sheet of metal with a waffle shaped support member welded thereto. The rolled rings 37 and 40 formed on the opposite ends of outer case 12 serve to strengthen the case at each end and also serve as an attaching member for the rotor drum support spokes and for attaching the outer case to the shroud 11. As shown in FIGURE 1, shroud 11 is shaped at 11A to form a support member which is welded to ring 37. Cowling 11 is formed integral with an airplane wing, not shown. The inlet duct 11A is fabricated of .001 sheet metal reinformed with a .001 waffle sheet stiffener in the same manner as drum 13 and outer case 12. The inlet to the engine is circular and the duct 11A forms the transition from the elliptical opening 11B to the circular ring 37. Exhaust nozzle 20, secured to ring 40 is also elliptical to reduce the chord length cut out in the wing and to reduce the weight of the tail cone 21. Nozzle 20 and tail cone 21 are fabricated of .001 plain sheet metal reinforced by a .001 inch thick waffle sheet of an alloy steel.

Compressor stator blades 14e, 14f, 14g, 14h, and turbine stator blades 15A are fabricated of reinforced thin sheet material of the order of .001 inch thickness in the same manner as the compressor and stator blades 14 and 15, respectively. The compressor stator blades and turbine stator blades are mounted upon outer case 12 in the same manner in which the compressor blades and turbine blades are supported upon drum 13. Accordingly it is not deemed necessary to show sectional views of these details. Outer case 12 is formed of thin sheet of the order of .001 inch thickness and is reinforced in the same manner as drum 13 by a thin waffle reinforcing member, similar to member 52.

It will be noted that the subject engine is designed to operate on hot air and that no combustion occurs in the vicinity of rotor drum 13 or the turbine section 15. Member 16 directs compressed air to a heat exchanger (not shown) which may derive its heat from any source, such as the sun. The air after taking on heat from the heat exchanger returns to the turbine section through passages 18 and 19. There is no direct air flow from the compressor section to the turbine section as is common in other types of turbine engines. The heat exchanger does not in and of itself constitute this invention and may be of any well known type.

The various features described provide an extremely light weight engine of adequate structural strength to accomplish the functions for which it is intended. In the following claims the reference to various elements of the engine as being formed of thin sheet metal means sheet metal of the order of .001 inch thickness as heretofore described.

I claim:

1. A turbine motor comprising a fixed outer shell, a rotor drum disposed within said shell, a plurality of compressor blades carried by said rotor drum, a plurality of stator blades carried by said outer shell and operatively associated with said compressor blades, a plurality of turbine blades carried by said rotor drum, a plurality of stator blades carried by said outer shell and operatively associated with said turbine blades, said rotor drum being shaped to form a closed vessel, a bearing at each end of said rotor drum, means securing said bearings, respectively to said outer shell, means for admitting gas compressed by said compressor blades to the interior of said rotor drum, means for permitting restricted flow of compressed gas from the interior to the exterior of said rotor drum, said compressed gas within said drum being effective on said drum to stiffen said drum, and said restricted flow of gas being effective to cool the surface of said drum.

2. A turbine motor comprising a fixed outer shell, a hollow rotor drum formed of thin sheet metal disposed within said shell, a plurality of compressor blades carried by said drum, stator blades carried by said outer shell and operatively associated with said compressor blades, a plurality of turbine blades carried by said rotor drum, stator blades operatively associated with said turbine blades and carried by said outer shell, said rotor drum being formed at each end to enclose a hollow chamber within said rotor drum, means for rotatably supporting said rotor drum in said outer shell including a bearing at each end of said drum, a plurality of spaced rods associated with each of said bearings respectively for supporting said bearings in said outer shell, means for admitting compressed air from said compressor blades into said hollow chamber within said drum, a restricted opening for permitting compressed air within said chamber to escape from the interior of said rotor drum, said compressed air within said chamber being effective to cool said drum and to stiffen said drum.

3. A turbine motor comprising a fixed outer shell, a rotor drum disposed within said shell, means for supporting said drum for rotation in said shell including first and second bearings at the opposite ends, respectively, of said drum, a first set of spaced support rods forming a cone having its vertex forward of said drum and fixed to said first bearing, means for securing said support rods to said shell, a second set of support rods forming a second cone having its vertex rearwardly of said drum and fixed to said second bearing, means for securing said second set of support rods to said shell, a plurality of compressor blades on said rotor drum, a plurality of stator blades on said outer shell cooperating with said compressor blades to provide a compressor section for compressing air, a plurality of turbine blades on said rotor drum, a plurality of stator blades on said outer shell cooperating with said turbine blades to provide a turbine section, means intermediate said compressor section and said turbine section for preventing direct flow of compressed air from said compressor section to said turbine section, a heat exchanger, a passage connecting said compressor section to said heat exchanger, a passage connecting said turbine section to said heat exchanger, means for admitting relatively cool compressed air from said compressor section to the interior of said rotor drum, and a restricted opening in said rotor drum for permitting restricted air flow of said relatively cool compressed air through said rotor drum.

4. A turbine motor comprising a fixed outer shell, a rotor drum disposed within said outer shell, blading carried by said rotor drum and said outer shell providing a compressor section for compressing air, blading carried by said rotor drum and said outer shell providing a turbine section, means preventing direct flow of compressed air from said compressor section to said turbine section, a heat exchanger, a passage connecting said compressor section to said heat exchanger for admitting relatively cool compressed air to said heat exchanger, a passage connecting said heat exchanger to said compressor section for admitting relatively hot air from said heat exchanger to said turbine section, means rotatably supporting said rotor drum in said outer shell including support pins fixed to said drum at the opposite ends of said drum, respectively, and bearings at opposite ends of said rotor drum carried by said support pins, openings in said rotor drum for admitting relatively cool compressed air from said compressor section to the interior of said rotor drum, and an outlet through one of said support pins for permitting restricted flow of said compressed air from the interior of said drum to one of said bearings for cooling said bearing.

5. A light weight turbine motor comprising an outer shell formed of thin sheet metal, a rotor drum formed of thin sheet metal disposed within said outer shell, a series of light weight compressor blades formed of thin sheet metal carried by said rotor drum, a series of light weight reactor blades carried by said outer shell, said reactor blades being fabricated of thin sheet metal and cooperating with said compressor blades to provide a compressor section for compressing air, a plurality of turbine blades fabricated of thin sheet metal and carried by said rotor drum, a plurality of reactor blades fabricated of thin sheet metal carried by said outer shell and cooperating with said turbine blades to provide a turbine section, means preventing direct flow of compressed air from said compressor section to said turbine section, a heat exchanger, a passage connecting said compressor section to said heat exchanger for admitting relatively cool compressed air to said heat exchanger, a passage connecting said heat exchanger to said turbine section for admitting relatively hot air from said heat exchanger to said turbine section, openings in said rotor drum for admitting relatively cool compressed air from said compressor section to the interior of said drum, means rotatably supporting said rotor drum in said outer shell including a bearing at each end of said drum, and a restricted opening in said drum for permitting restricted flow of air from the interior of said drum to one of said bearings to cool said bearing while maintaining air under pressure within said drum.

6. A light weight engine comprising an outer shell formed of thin sheet metal, a rotor drum formed of thin sheet metal supported for rotation in said outer shell, a waffle shaped reinforcing member formed of thin sheet metal extending throughout the internal surface of said rotor drum and welded thereto, a plurality of hollow compressor blades formed of thin sheet metal carried by said rotor drum, a plurality of hollow reactor blades formed of thin sheet metal carried by said outer shell, said compressor blades and reactor blades forming a compressor section for said engine, a plurality of hollow turbine blades formed of thin sheet metal carried by said rotor drum, a plurality of hollow reactor blades formed of thin sheet metal carried by said outer shell, said last-mentioned reactor blades and said turbine blades forming a turbine section for said engine, an annular member formed of thin sheet metal carried by said rotor drum and positioned between said compressor section and said turbine section, said annular member being effective to block direct passage of air from said compressor section to said turbine section, a heat exchanger, a passage connecting said compressor section to said heat exchanger adapted to impart heat to the compressed air, and a conduit connecting said heat exchanger to said turbine section to conduct heated air from said heat exchanger to said turbine section.

7. A light weight engine comprising an outer shell formed of thin sheet metal, a rotor drum formed of thin sheet metal supported for rotation in said outer shell, a waffle shaped reinforcing member formed of thin sheet metal extending throughout the internal surface of said rotor drum and welded thereto, a plurality of hollow compressor blades formed of thin sheet metal carried by said rotor drum, a plurality of hollow reactor blades formed of thin sheet metal carried by said outer shell, said compressor blades and reactor blades forming a compressor section for compressing air, a plurality of hollow turbine blades formed of thin sheet metal carried by said rotor drum, a plurality of reactor blades formed of thin sheet metal carried by said outer shell, said last-mentioned reactor blades and said turbine blades forming a turbine section adapted to rotate said rotor drum, an annular member formed of thin sheet metal and welded to the outer surface of said rotor drum, said annular member being positioned between said compressor section and said turbine section for reinforcing said rotor drum and for preventing direct passage of air from said compressor section to said turbine section, a heat exchanger, a passage connecting said compressor section to said heat exchanger for admitting compressed air to said heat exchanger, a passage connecting said heat exchanger to said turbine section for admitting relatively hot air from said heat exchanger to said turbine section, and means for admitting compressed air from said compressor section to the interior of said rotor drum for maintaining air under pressure within said rotor drum.

8. A light weight engine comprising an outer shell formed of thin sheet metal, a rotor drum formed of thin sheet metal disposed for rotation within said outer shell, a thin sheet metal waffle shaped reinforcing member extending throughout the internal surface of said rotor drum and welded thereto, a plurality of hollow compressor blades formed of thin sheet metal carried by said rotor drum, a plurality of hollow reactor blades formed of thin sheet metal carried by said outer shell, said compressor blades and reactor blades forming a compressor section for said engine, a plurality of hollow turbine blades formed of thin sheet metal carried by said rotor drum, a plurality of hollow reactor blades formed of thin sheet metal carried by said outer shell, said last-mentioned reactor blades and said turbine blades forming a turbine section for said engine, an annular upstanding member formed of thin sheet metal carried by said rotor drum, said annular member being effective to prevent direct flow of compressed air from said compressor section to said turbine section and to reinforce said rotor drum intermediate said turbine section and said compressor section, a heat exchanger, a passage for conducting compressed air from said compressor section to said heat exchanger, a passage for conducting heated air from said heat exchanger to said turbine section, a bearing at each end of said rotor drum supporting said drum for rotation within said outer shell, openings in said rotor drum for permitting compressed air from said compressor section into the interior of said rotor drum, and means for permitting restricted flow of air from the interior of said drum to one of said bearings for cooling said bearing.

9. A light weight engine comprising an outer shell formed of thin sheet metal, a rotor drum formed of thin sheet metal, means rotatably supporting said rotor drum in said outer shell, a reinforcing member formed of thin sheet metal extending throughout the internal surface of said rotor drum and secured thereto, a plurality of compressor blades formed of thin sheet metal carried by said rotor drum, a plurality of slots in said rotor drum adapted to receive a portion of said compressor blades, respectively, said blades having bent over flanges disposed within said rotor drum and secured to said reinforcing member, additional reinforcing means for distributing the load applied to said rotor drum by said compressor blades, a plurality of reactor blades formed of thin sheet metal carried by said outer shell and cooperating with said compressor blades to provide a compressor section for said engine, a plurality of turbine blades formed of thin sheet metal carried by said rotor drum, a plurality of slots in said rotor drum adapted to receive a portion of said turbine blades, flanges on said turbine blades secured to said drum within said drum, means for distributing the load applied to said drum by said turbine blades, reactor blades carried by said outer shell and cooperating with said turbine blades to provide a turbine section for rotating said rotor drum, a reinforcing member formed of thin sheet metal secured to said rotor drum between said compressor section and turbine section and preventing direct flow of compressed air from said compressor section to said turbine section, a heat exchanger, means conducting compressed air from said compressor section to said heat exchanger, and means conducting heated air from said heat exchanger to said turbine section.

10. A light weight engine comprising an outer shell formed of thin sheet metal, a rotor drum formed of thin sheet metal disposed for rotation in said outer shell, a bearing at each end of said rotor drum supported upon said rotor drum, means for rotatably supporting said bearings in said outer shell comprising a first set of spokes at one end of said drum and a second set of spokes at the opposite end of said drum, the spokes at one end of said drum forming a cone with its vertex forward of the drum and the spokes at the other end of said drum forming a cone with its vertex rearwardly of said drum, compressor blades and turbine blades formed of thin sheet metal carried by said rotor drum, a set of reactor blades formed of thin sheet metal carried by said outer shell cooperating with said compressor blades to provide a compressor section, a second set of reactor blades carried by said shell cooperating with said tubine blades to provide a turbine section, an annular reinforcing member formed of thin sheet metal carried by said rotor drum and disposed between said compressor section and turbine section to prevent direct air flow between said section, a heat exchanger, an air conduit for conducting compressed air from said compressor section to said heat exchanger, and a conduit for conducting heated air from said heat exchanger to said compressor section.

11. A light weight engine comprising an outer shell formed of thin sheet metal, a rotor drum formed of thin sheet metal disposed for rotation in said outer shell, a bearing at each end of said rotor drum supported upon said rotor drum, means for rotatably supporting said bearings in said outer shell comprising a first set of spokes at one end of said drum and a second set of spokes at the opposite end of said drum, the spokes at one end of said drum forming a cone with its vertex forward of the drum and the spokes at the other end of said drum forming a cone with its vertex rearwardly of said drum, compressor blades and turbine blades formed of thin sheet metal carried by said rotor drum, a set of reactor blades formed of thin sheet metal carried by said outer shell cooperating with said compressor blades to provide a compressor section, a second set of reactor blades carried by said shell cooperating with said turbine blades to provide a turbine section, an annular reinforcing member formed of thin sheet metal carried by said rotor drum and disposed between said compressor section and turbine section to prevent direct air flow between said section, a heat exchanger, an air conduit for conducting compressed air from said compressor section to said heat exchanger, and a conduit for conducting heated air from said heat exchanger to said compressor section, openings in said rotor drum for admitting relatively cool air under pressure from said compressor section to the interior of said drum, and means permitting restricted flow of compressed air from the interior of said drum to one of said bearings for cooling said bearing.

12. A light weight engine comprising an outer shell formed of thin sheet metal, a rotor drum formed of thin sheet metal, a bearing at each end of said rotor drum for rotatably supporting said drum in said outer shell, a plurality of support wires associated with said bearings, respectively for supporting said bearings respectively, on said outer shell, a reinforcing member formed of thin sheet metal extending throughout the internal surface of said rotor drum and secured thereto, a plurality of hollow compressor blades formed of thin sheet metal carried by said rotor drum, a plurality of slots in said rotor drum adapted to receive said compressor blades, respectively, said blades having bent over flanges within said rotor drum secured to said reinforcing member, a plurality of reinforcing wires on the external surface of said rotor drum extending around said rotor drum for distributing the load applied to said rotor drum by said compressor blades, a plurality of hollow reactor blades formed of thin sheet metal carried by said outer shell, said compressor blades and reactor blades providing a compressor section for compressing air, a plurality of turbine blades formed of thin sheet metal carried by said rotor drum, a plurality of slots in said rotor drum adapted to receive said turbine blades, flanges on said turbine blades within the interior of said drum, an angle doubler having a portion thereof disposed between the flanges of said turbine blades and said first-mentioned reinforcing member and a second portion adapted to receive a reinforcing member within said rotor drum, an additional reinforcing member supported in said angle doubler for distributing the load applied to said rotor drum by said turbine blades, a plurality of reactor blades carried by said outer shell and providing with said turbine blades a turbine section for rotating said rotor drum, means preventing direct passage of air from said compressor section to said turbine section, a heat exchanger, means conducting compressed air from said compressor section to said heat exchanger and means conducting heated air from said heat exchanger to said turbine section.

References Cited in the file of this patent

UNITED STATES PATENTS

| 667,744 | Stolze | Feb. 12, 1901 |
| 2,528,635 | Bell et al. | Nov. 7, 1950 |
| 2,620,123 | Parducci | Dec. 2, 1952 |
| 2,776,087 | Walter | Jan. 1, 1957 |
| 2,847,184 | Islip | Aug. 12, 1958 |

FOREIGN PATENTS

| 923,518 | Germany | Feb. 14, 1955 |